Feb. 20, 1951 R. W. GRIFFITH 2,542,191
TRAVELING NIGGER FOR SAWMILLS
Filed Oct. 15, 1948 4 Sheets-Sheet 1
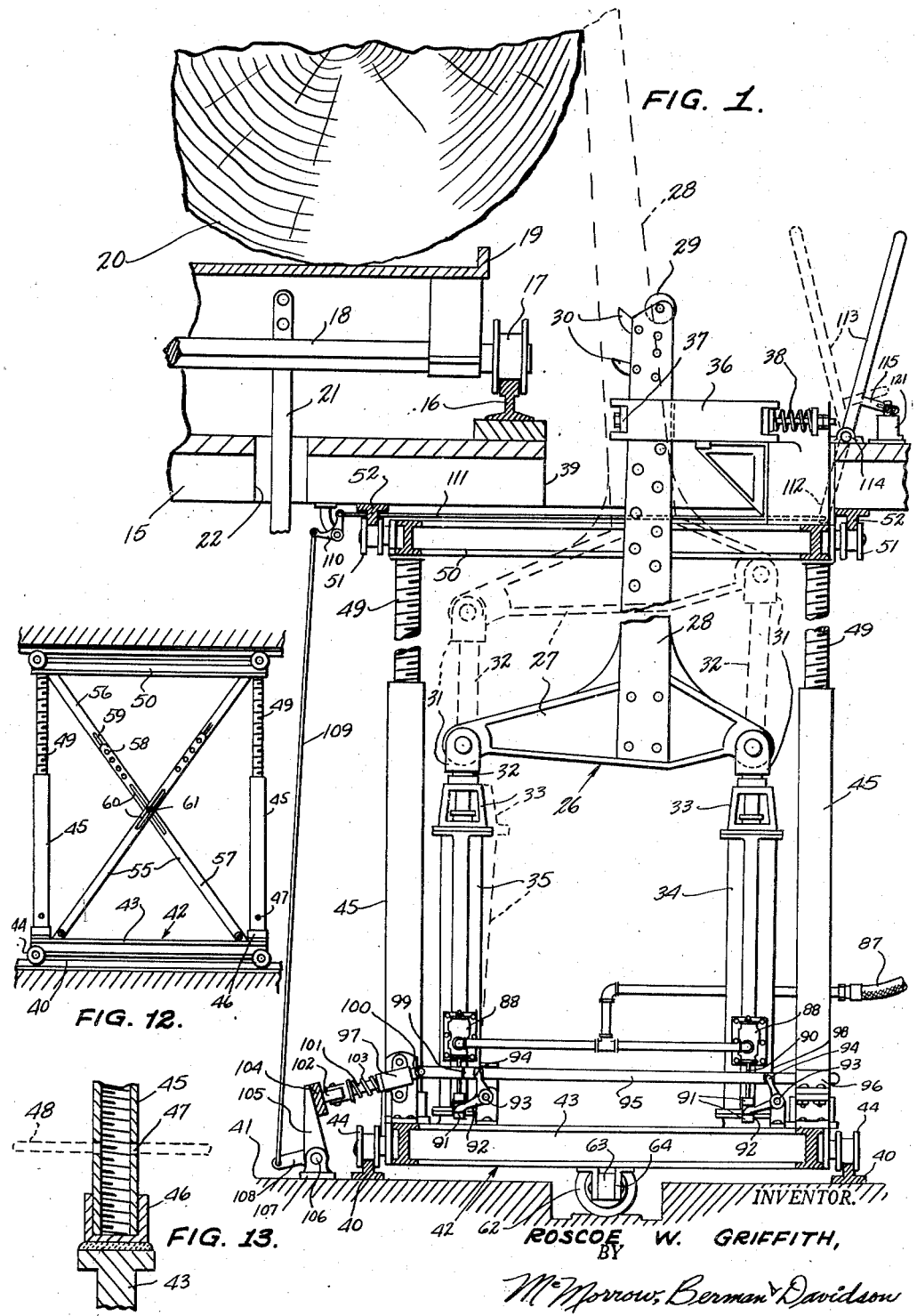
INVENTOR.
ROSCOE W. GRIFFITH,
BY McMorrow, Berman & Davidson
ATTORNEYS.

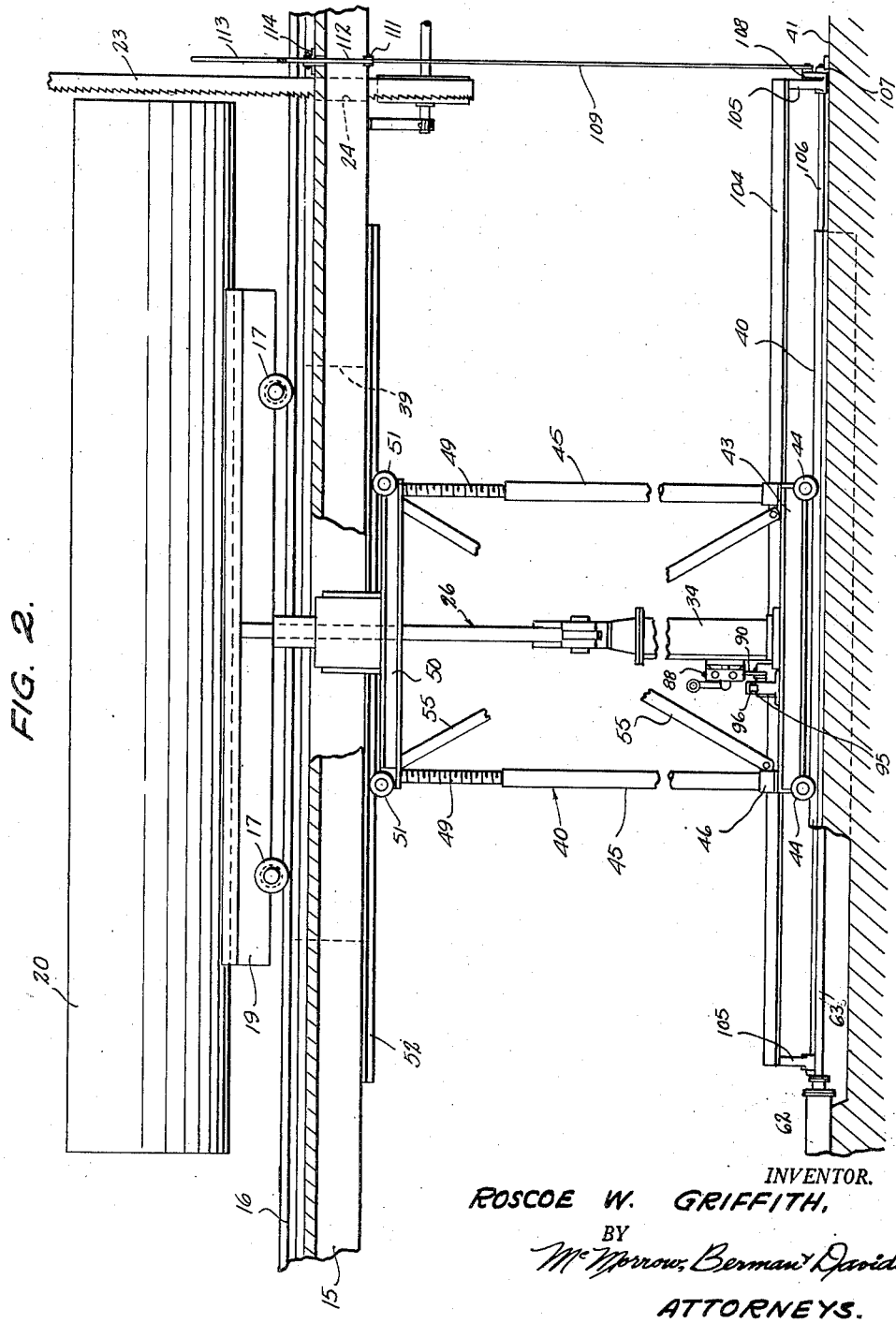

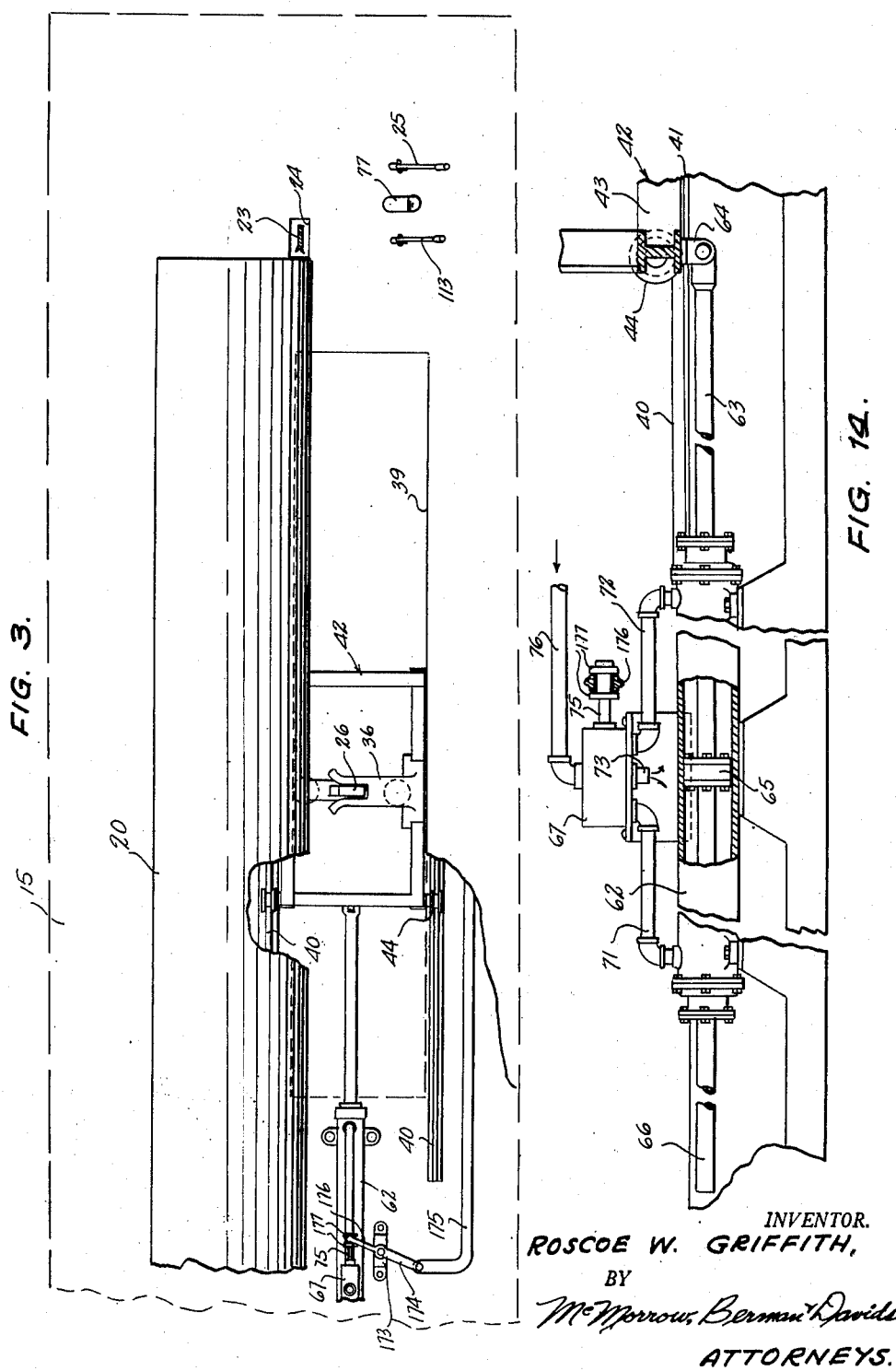

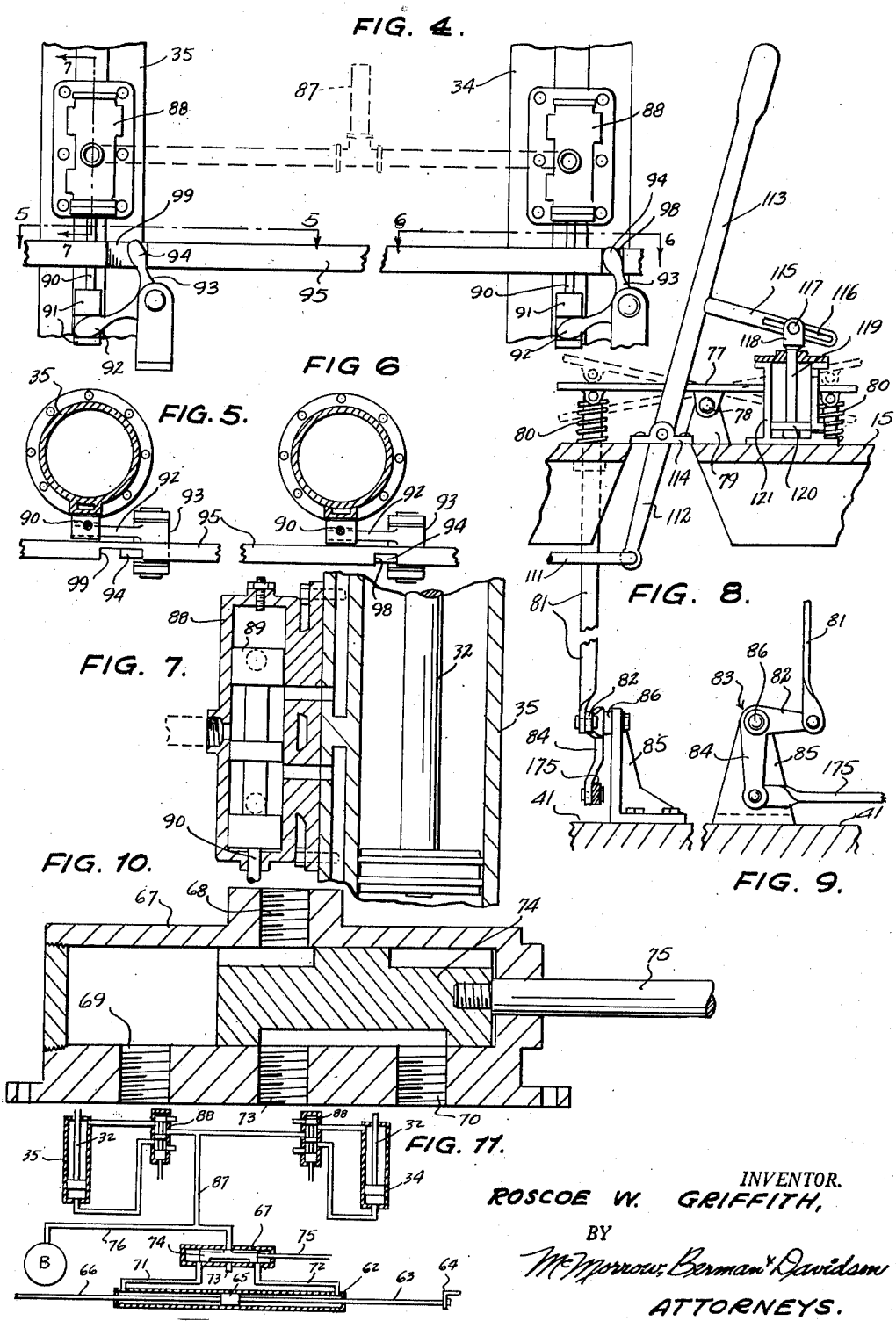

Patented Feb. 20, 1951

2,542,191

UNITED STATES PATENT OFFICE 2,542,191

TRAVELING NIGGER FOR SAWMILLS

Roscoe W. Griffith, Parkersburg, W. Va., assignor of five per cent to Jacob Ligon Coyner, Clover Lick, W. Va.

Application October 15, 1948, Serial No. 54,711

5 Claims. (Cl. 143—125)

My invention relates to sawmills, and more particularly to sawmills of the type wherein a log carriage is reciprocated past a power saw whereby successive planks or boards are sawed from the log. In such mills, it is customary to provide a power-actuated means known as a "nigger" for turning the log on the carriage from time to time. Customarily, the nigger operates from a fixed position a relatively great distance from the saw whereby it is necessary to stop the carriage for each actuation of the nigger and whereby the carriage must have a relatively long stroke. Such carriage stoppage and the long stroke thereof waste considerable time whereby to reduce the efficiency of the sawmill. I have found that by mounting the nigger for movement in phase with the carriage, not only can the nigger be mounted closer to the saw whereby the stroke of the saw carriage can be materially shortened, but the necessity for stopping the carriage to turn the log is eliminated. Thus, considerable time is saved in sawing each log whereby greater production is possible. Such movement of the nigger in phase with the log carriage can be accomplished in a number of different ways by utilizing the same power used to actuate the saw carriage and the saw.

With the foregoing in view, it is an object of my invention to provide means mounting a nigger for linear movement in phase with the log carriage and means for actuating the nigger while the same is in motion.

A further object is to provide in combination with a movable log carriage a second carriage, means mounting the second carriage for movement parallel to the log carriage, means mounting a power-actuated nigger on said second carriage, means for moving the second carriage at times in phase with the log carriage, and means for actuating the nigger while said second carriage is moving in phase with the log carriage.

A further object is to provide in a device such as that last described separate controls for each carriage and the nigger, such controls being located at a sawyer's station and adapted to be actuated by the sawyer.

A further object is to provide a movable carriage for a power-actuated nigger, means mounting said carriage for movement in phase with a log carriage, and means bracing said carriage against tilting movement of the same while moving in phase with a log carriage.

A further object is to provide in a nigger carriage such as that last described upper and lower tracks for the carriage, upper and lower sets of wheels engageable with said tracks, and means for adjusting the carriage upwardly into a relative tight engagement with both sets of tracks.

Other objects and advantages reside in the particular structure of the invention, the structure of the several parts thereof, combinations and sub-combinations of such parts, the particular means for operating the device, all of which will be readily understood by those skilled in the art upon reference to the attached drawings in connection with the following specification, wherein the invention is shown, described and claimed.

In the drawings:

Figure 1 is a transverse vertical sectional view through the device according to the invention showing the same applied to a conventional sawmill;

Figure 2 is an elevational view on a reduced scale, parts being broken away and parts being shown in longitudinal vertical section;

Figure 3 is a plan view of the device, parts being broken away;

Figure 4 is a fragmentary end elevation on an enlarged scale showing certain details of the controls for the traveling nigger;

Figure 5 is a horizontal sectional view taken substantially on the plane of the line 5—5 of Figure 4;

Figure 6 is a horizontal sectional view taken substantially on the plane of the line 6—6 of Figure 4;

Figure 7 is a fragmentary vertical sectional view taken substantially on the plane of the line 7—7 of Figure 4;

Figure 8 is a fragmentary transverse vertical sectional view through the sawyer's station showing certain of the controls there located;

Figure 9 is a fragmentary elevational view of a detail of Figure 8 looking from the right of Figure 8;

Figure 10 is an enlarged longitudinal vertical sectional view of a valve for controlling the operation of the nigger carriage;

Figure 11 is a diagrammatic sectional view showing the hydraulic system for controlling the operation of the nigger carriage and the nigger;

Figure 12 is an elevational view on a reduced scale of the nigger carriage apart from the nigger;

Figure 13 is a fragmentary vertical sectional view showing a detail of the nigger carriage;

Figure 14 is an enlarged fragmentary elevational view, parts being broken away and shown in longitudinal vertical section showing the means for moving the nigger carriage.

Referring specifically to the drawings, wherein like reference characters have been used throughout the several views to designate like parts, 15 designates the floor of a sawmill upon which is mounted suitable track 16 for the running gear of any suitable and/or well known type of log carriage. Thus, the track or rails 16 engages a flanged wheel 17 mounted on an axle 18 for a log carriage 19 for a log 20. A frame 21 for the log carriage extends downwardly through a slot 22 formed in the floor 15. The lower end of the frame 21 is operatively connected to any suitable means, not shown, for reciprocating the carriage 19 on the track 16 in accordance with conventional practice. The carriage 19 is equipped with any suitable mechanism, not shown, for setting the log 20 forwardly for successive cuts and suitable dogs, not shown, are provided for locking the log 20 in a set position. In the embodiment illustrated, the sawmill is a band sawmill and includes a band saw 23, the working run of which operates through a slot 24 formed in the floor 15 for the mill. The sawyer's station is located adjacent the working run of the band saw 23 and includes a lever 25 for controlling the reciprocation of the carriage 19. As so far described, the structure is conventional and forms no part of my invention.

It is understood that logs 20 are fed to the carriage 19 in any suitable and/or well known manner, as from a log deck, not shown, located at substantially the same level as the carriage 19. After a log has been fed to the carriage 19, a slab is usually sawed from one side thereof by the saw 23. Thereafter, it is necessary to turn the log 20 one or more times so as to square the same. Likewise, after a log has been squared, it is frequently necessary to turn the log on the carriage from time to time so that the lumber contained in the log may be sawed most advantageously. To turn a log on the carriage, as aforesaid, all mills include one or more forms of log-turning devices generally known as "niggers," and which are power actuated. In a mill such as has been disclosed hereinabove, the nigger is usually located below the floor 15 for the mill and is movable upwardly from a retracted position below the level of the log deck into engagement with the log whereby to turn the same. Such niggers have stationary mounts and are located some distance from the saw and the carriage is customarily stopped opposite the nigger during the actuation thereof whereby to prevent damage to the nigger and/or the log while the same is being turned. As aforesaid, such stoppage of the carriage unnecessarily delays the sawing operation, whereby to add to the expense of the cut lumber. The essential feature of the invention is to provide means for mounting a conventional nigger for movement in phase with the log carriage, whereby the log 20 may be turned while the log carriage is in motion so as to eliminate the usual delay incident to the turning of the log.

As best seen in Figure 1, I have provided a nigger 26 of well known form and structure and which may include a crotch-type nigger bar or upstanding mechanism including means engageable with the log 20 for partially rotating same while supported on the carriage 19, such mechanism comprising a transverse crotch 27 to which is secured in any suitable manner a pair of side bars 28 which extend vertically from the crotch 27. The upper ends of the side bars 28 have journaled therebetween a roller 29 adapted to engage the log 20 when the side bars are projected upwardly, as will be described presently. The inner faces of the side bars 28 have secured therebetween a plurality of log-engaging ratchet teeth 30 which are adapted to dig into the log 20 upon upward movement of the side bars, but which pivot upwardly for ready retraction out of the log 20 upon downward movement of the side bars in a well known manner. The ends of the crotch 27 are transversely bored to provide journals for pivotal connection with the crossheads 31 of piston rods 32 for movement about a horizontal axis. The piston rods 32 are guided for vertical movement in the top heads 33 of right and left-hand cylinders 34 and 35, respectively. The nigger illustrated is of the semi-oscillating type wherein the cylinder 34 is fixed to a base, while the cylinder 35 is pivoted to a base for oscillating movement from the full line to the broken line position of Figure 1. Likewise, it is contemplated that fluid pressure will be admitted to the cylinder 34 slightly before it is admitted to the cylinder 35 whereby the right-hand end of the crotch 27 will be elevated slightly before the left-hand end is raised. The effect of this action is clearly illustrated in broken lines in Figure 1, and causes the side bars 28 to be canted forwardly into engagement with the log 20 as they are raised. Obviously, this movement necessitates oscillation of one or both of the cylinders 34 and 35 in a well known manner. In this connection, it should be pointed out that the particular nigger structure just described is typical of well known power-actuated niggers capable of being used with the invention. Likewise, the movement of the side bars 28 is guided and limited by a transversely disposed embracing means or a bifurcated floor plate 36 which is fixed to the carriage for the cylinders 34 and 35, to be described later. Such floor plate 36 is of well known structure and includes a crosshead 37 engaging the front edges of the side bars 28 and loading the same to a retracted position by means of coil springs 38, only one of which is shown. Thus, as the side bars move from the full to the broken line position, the crosshead 37 moves forwardly against the action of the springs 38. Upon downward movement of the side bars 28, the crosshead 37 retracts the side bars back between the bifurcations of the floor plate 36.

In the embodiment of the invention illustrated, the mill floor 15 is provided with an elongated opening 39 parallel to the log carriage track 16 and through which the side bars 28 are projected and in which such side bars are laterally reciprocated by means now to be described. As best seen in Figures 1, 2 and 3, a pair of laterally-spaced rails 40 are provided in a sub-floor 41 below the floor 15. Such rails 40 comprise a lower track for a nigger carriage 42. The carraige 42 includes a horizontally-disposed bottom frame 43 in which is journaled a plurality of flanged wheels 44 which are rollable on the track rails 40. The bottom frame 43 includes any suitable and/or well known means mounting the cylinders 34 and 35 whereby to provide a firm base for the same. The bottom frame 43 is preferably rectangular and has fixed at each corner thereof an upright vertical frame member 45 which is preferably of tubular construction. As best seen in Figure 13, each upright 45 is preferably rotatably mounted in a socket 46 rigidly secured in any suitable and/or well known manner to the upper surface of the bottom frame 43. Likewise, each upright 45 may be interiorly threaded and provided with transverse aligned openings 47 for the insertion therethrough of any suitable cross-bar 48 whereby the uprights 45 may be rotated in the sockets 46.

The uprights 45 are open at their upper ends and threadedly receive the threaded rods 49 which depend from the four corners of a rectangular and horizontally-disposed top frame 50 for the nigger carriage. Likewise, the corners of the upper carriage 50 are provided with upwardly-directed flanged wheels 51 which are adapted to be rollably engaged with laterally-spaced rails 52 fixed in any suitable manner to the under surface of the floor 15 of the mill. From the foregoing, it is obvious that by turning the uprights 45 in their sockets 46, the threaded rods 49 together with the top frame 50 will be raised or lowered into and out of engagement with the overhead track defined by the rails 52. Thus, the nigger carriage 42 is braced against tilting in any direction by the firm engagement of the wheels 44 and 51 with the upper and lower track-providing rails 40 and 52, respectively. This is regarded as an important feature of the invention in view of the substantially great strain imposed upon the base for the nigger incident to its normal operation. Also, by making the uprights for the nigger carriage vertically adjustable, the carriage is adjustable to fit mills of various sizes.

The nigger carriage 42 is braced against collapse by crossed trusses best seen in Figures 2 and 12. Such trusses comprise a pair of diagonal braces 55 along each side of the carriage 42. Each brace 55 comprises a pair of sections 56 and 47 which are connected together for extension and retraction by means of pins 58 of one section working in slots 59 of the other sections. Likewise, the braces 55 are crossed and the intermediate portions of the crossed sections are provided with slots 60 which slidably receive pins 61 which permit the extension and contraction of the braces 55 as the upper frame 50 is elevated and/or retracted relative to the lower frame 43. In addition to the aforementioned bracing for the sides of the carriage 42, similar or identical bracing may extend from side to side across the front and rear ends of the carriage and connecting the upper and lower carriage frames. For the sake of clarity, such bracing has not been illustrated in Figure 1, but it is understood that it may be present if found desirable.

The nigger carriage 42 is reciprocated on the rails 40 and 52 by means now to be described and best illustrated in Figure 14. Such means comprises a steam cylinder 62 which is recessed in the sub-floor 41 and fixed thereto in any suitable manner. The cylinder 62 includes a piston rod 63 extending axially outwardly of the cylinder at one end thereof. The free end of the piston rod 63 is pivoted to a crosshead 64 which in turn is fixedly secured to the under side of the carriage 42. A piston 65 is slidable in the cylinder 62 and fixedly connected to the inner end of the piston rod 63. In view of the relatively great length of the piston rod 63 which is necessary to reciprocate the nigger carriage 42 substantial distances on the rails aforesaid, there has been provided an oppositely-directed piston rod 66 which extends axially through the opposite end of the cylinder 62 to provide a guide and steadying member for the piston 65 and piston rod 63 during their movement. Steam is supplied to opposite ends of the cylinder 62 through a steam chest 67 which includes an inlet port 68 for live steam and a pair of outlet ports 69 and 70 leading respectively to opposite ends of the cylinder 62 by way of conduits 71 and 72. Exhaust steam is discharged to the atmosphere through an exhaust port 73 intermediate the ports 69 and 70. A slide valve 74 is slidable in the chest 67 and its movements are controlled by a control rod 75. In the position shown in Figure 10, the slide valve is positioned to supply steam through the inlet port 68 and port 69 to the left-hand end of the cylinder 62. Exhaust steam escapes from the cylinder through the port 70 and exhaust port 73 in a well known manner. Movement of the slide valve 74 to the opposite end of the steam chest 67 will reverse the feed of steam and move the piston 65 in opposite directions. However, when the slide valve is positioned intermediate the ends, the inlet port 68 is substantially blocked and pressure is equalized on opposite sides of the piston 65 whereby the same is maintained centrally of the cylinder 62, as illustrated in Figure 14. This neutral position is automatically achieved by means now to be described. Steam for actuating the piston 65 is supplied to the cylinder 62 from a boiler B, Figure 11, by way of a steam line 76. Actuation of the rod 75 for the slide valve 74 is accomplished by means of a balanced foot pedal 77 located at the sawyer's station. The pedal 77 is pivoted by any suitable means 78 to any suitable brackets 79 in slightly vertically-spaced relation to the mill floor 15 in the region of the sawyer's station. The pivot-providing means 78 is located intermediate the ends of the pedals 77 and the opposite free ends of such pedal are balanced to a horizontal position by any suitable means, such as the expansive springs 80 interposed between such free ends and the upper surface of the floor 15. Thus, the normal position of the pedal 77 is the full line position illustrated in Figure 8. However, it is readily apparent that the forward end of the pedal may be elevated or depressed to the broken line positions by imparting a rocking movement to the pedal by means of the sawyer's foot. The forward end of the pedal 77 has pivoted thereto the upper end of a drag link 81 which extends downwardly through the floor 15 and is slidable therethrough. The lower end of the drag link 81 is pivoted by any suitable means to the free end of a horizontal arm 82 of a bell crank 83. The bell crank 83 is pivoted by any suitable means 86 to any suitable standard 85 fixed to the sub-floor 41. The bell crank 83 includes a depending arm 84. The free end of the bell crank arm 84 is pivotally connected to one end of a drag link 175, the opposite end of which, Figure 3, is pivotally connected to an arm 174 of a double-armed lever which is pivoted to any suitable means 175 on the sub-floor 41. The other arm 176 of the double-armed lever is slidably interposed between a pair of spaced abutments 177 fixed to the free end of the slide valve-actuating rod 75.

With particular reference to Figures 8, 9 and 11, and also to Figure 14, with the pedal 77 horizontal, the arm 82 of the bell crank will be horizontal and the arm 84 substantially vertical. In this position of the parts, the slide valve 74 is in the neutral position and the piston 65 is located as illustrated in Figure 14, intermediate the ends of the cylinder 62. With the parts in this position, it is understood that the nigger carriage 42 is stationary intermediate the ends of the rails 40 and 52. Thus, the nigger carriage is capable of being moved in either direction in accordance with the movement of the log carriage 19 by either elevating or depressing the forward end of the pedal 77.

The nigger 26 is preferably actuated by steam also, and, in this connection, it should be understood that the log carriage 19 is likewise driven by steam, whereby a single source of power is effective to actuate both carriages and the nigger. However, all three might be operated by any other suitable source of power, if so desired. As illustrated diagrammatically in Figure 11, steam is supplied from the boiler B to the nigger cylinders 34 and 35 by way of a branch conduit 87 and identical steam chests 88. One of such steam chests is illustrated in Figure 7 in detail, and includes a slide valve 89 having a stem 90 extending downwardly therefrom. The slide valves 89 and steam chests 88 are conventional and form no part of the invention, and it should suffice to say that they control the flow of steam or fluid under pressure to the cylinders 34 and 35 in a well known manner, so as to reciprocate the piston rods 32 vertically. However, in the actuation of the cylinders 34 and 35, as aforesaid, it is desirable to actuate the cylinder 34 ahead of the cylinder 35. With this in view, the lower ends of the valve stems 90 are provided with spaced abutments 91 which receive the free ends of bell crank arms 92 of similar bell cranks 93. The bell cranks 93 are journaled for pivotal movement in any suitable manner on the lower frame 43 of the nigger carriage 42. As best seen in Figure 1, and also in Figure 4, the other arms 94 of the bell cranks 93 extend upwardly for engagement with a push-and-pull rod 95 which is slidably mounted on the nigger carriage in any suitable manner, as by the guides 96 and 97, Figure 1. The arm 94 of the right-hand bell crank 93 is seatable in a relatively narrow notch 98 formed in the push-and-pull rod 95. The dimensions of the notch 98 are such that there is substantially no lost motion between the push rod 95 and the arm 94 of the right-hand bell crank 93. However, the left-hand bell crank arm 94 is freely received in a relatively longer notch 99 formed in the push-and-pull rod 95, whereby to provide a lost-motion connection between the left-hand bell crank and the push-and-pull rod. As is readily apparent in Figure 4, upon movement of the rod 95 from left to right, the right-hand bell crank 93 will be immediately actuated in a clockwise direction, whereby the right-hand slide valve in the steam chest 88 is actuated to supply live steam to the lower end of the cylinder 34 and actuate its piston rod 32 upwardly. However, no movement is imparted to the left-hand bell crank 93 until the left-hand end of the notch 99 engages the bell crank arm 94. Thereafter, the left-hand bell crank will be pivoted in a clockwise direction and the left-hand slide valve will be effective to supply live steam to the lower end of the cylinder 35 whereby to actuate its piston 32 upwardly. In like manner, upon reverse movement of the rod 95 from right to left, the right-hand bell crank and slide valve will be actuated before the left-hand bell crank and slide valve, whereby the side bars 28 will be rocked to a vertical position prior to the retraction of the nigger bar to the full line position of Figure 1.

As best seen in Figure 1, the left-hand end of the push rod 95 has pivoted thereto by any suitable means 100 a relatively short push rod 101. Such push rod 101 is slidable in the left-hand guide 97 and has its free outer end provided with any suitable anti-friction means, such as the roller 102. An expansive coil spring 103 is concentrically disposed about the push rod 101 between the roller 102 and the guide 97, whereby to load the push rod 95 to its extreme left-hand position wherein the bell cranks 93 are rocked to their limits in counter-clockwise directions. It is understood, however, that with the bell cranks 93 so positioned, no steam is supplied to either cylinder 34 or 35, and the nigger 26 is retained in the retracted or full line position of Figure 1. Thus, in this position the slide valves 89 are in the position illustrated in Figure 7, where steam is supplied to the upper ends of the cylinders 34 and 35, whereby to load the pistons to their lowermost positions. However, when the push rods 101 and 95 are moved from the Figure 1 position from left to right, the valve stems 90 will be elevated and steam will be supplied to the lower ends of the cylinders 34 and 35, whereby to elevate the pistons and piston rods 32. Actuation of the push rods 101 and 95 is accomplished by a tipping rod 104, best seen in Figure 1 and in Figure 2. The tipping rod 104 is an elongated member extending substantially the entire length of the lower rails 40 at one side thereof. In effect, the tipping rod 104 comprises an elongated crank arm connected at the opposite ends to the free ends of a pair of bell crank levers 105 fixed to a crank shaft 106. The crankshaft 106 is journaled for rotation in any suitable member 107 fixed to the sub-floor 41. The tipping rod 104 and the bell crank arms 105 are rocked by a bell crank lever 108 extending from the crank shaft 106 at an angle. The free end of the lever 108 is pivotally connected in any suitable manner to a drag link 109 which extends upwardly in laterally-spaced relation to the nigger carriage. The upper end of the drag link 109 is operatively connected to a bell crank 110 fixed to the under surface of the mill floor 15 to a second drag link 111 which extends horizontally below the mill floor 15 to the region of the sawyer's station. At such point, the free end of the drag link 111 is pivotally connected to the lower arm 112 of an actuating lever 113 pivoted on the upper surface of the mill floor 15 by any suitable means 114. As is obvious from Figure 1, when the operating lever 113 is moved from the full line position to the broken line position, the crank shaft 106 will be pivoted in a clockwise direction, whereby the tipping rod 104 will force the push rods 101 and 95 from left to right, whereby to actuate the cylinders 34 and 35 as aforesaid. Return movement of the operating lever 113 will retract the nigger 26 to the full line position of Figure 1. The operating lever 113 has fixed thereto a laterally-directed arm 115, the free end of which is longitudinally slotted, as at 16, to receive the wrist pin 117 of a crosshead 118. The crosshead 118 is fixed on the upper end of a piston rod 119 for a piston 120 which works in a dashpot 121. The purpose of this arrangement is to maintain the operating lever 113 in either the broken or full line position, Figure 1, whereby it will not require constant attendance by the sawyer. At the same time, upon the exertion of sufficient force, the operating lever 113 may be moved to and from either position.

From the foregoing, it is apparent that all of the controls for the log carriage, nigger carriage and the nigger itself are located at the sawyer's station and are readily operated by him. It should be noted also that the branch steam conduit 87 supplying steam to the cylinders 34 and 35 comprises a flexible hose of sufficient length to permit unrestricted travel of the nigger carriage along its rails 40 and 52. In the operation of the device, it is unnecessary for the nigger carriage to travel the full length of the stroke of the log carriage. Indeed, this arrangement would necessitate the opening 39 in the mill floor 15 being unduly long, whereby it would be impossible to roll logs from the log deck, not shown, onto the log carriage 19. Inasmuch as the floor plate 36, which is fixed to the upper frame 50 of the nigger carriage, and the nigger bar extend upwardly through such opening, the passage of these parts must of necessity be unimpeded. In the case of large mills, where the travel of the nigger carriage 42 must be substantially long and in some instances longer than the length of the shortest log, it is contemplated that laterally swingable skids will span the opening 39, whereby to support logs moved from the log deck onto the log carriage. At the same time, such skids will swing to the left and right upon impact with the floor plate 36 and/or the nigger bar to permit unimpeded passage of the same in the opening 39.

In the operation of the device, a log 20 is fed onto the log carriage 19 in any suitable manner and suitably secured thereto. When the log carriage arrives opposite the nigger carriage, the same is actuated in the same direction as the log carriage by depression or elevation of the pedal 77. At the same time, the sawyer may operate the operating lever 113 to actuate the nigger to turn the log as desired. When such turning has been accomplished, the sawyer merely releases his foot pressure from the pedal 77 which automatically turns to a neutral position stopping the nigger carriage. Likewise, this arrangement returns the nigger carriage to its next position. Meanwhile, of course, the actuating lever 113 has been again retracted to retract the nigger 26 to the full line position in Figure 1. This operation is repeated as often as necessary during successive strokes of the log carriage 19, whereby no time is lost in turning the log while the same is being sawed. In view of the fact that it has been estimated that such lost time may amount to as much as 15 per cent of the total actuating time of the log carriage, it is obvious that the device according to the invention results in a substantial saving in both time and labor.

While I have shown and described what is now thought to be a preferred embodiment of the invention, it is to be understood that the same is susceptible of other forms and expressions. Consequently, I do not limit myself to the precise structure shown and described hereinabove except as hereinafter claimed.

I claim:

1. In a sawmill including a vertically disposed saw, a longitudinally extending carriage positioned on one side of said saw and mounted for reciprocatory movement toward and away from said saw for supportingly feeding a log to be cut into and out of engagement with said saw, a second carriage positioned in spaced parallel relation with respect to said first named carriage and mounted for limited reciprocatory movement parallel to and opposite at least a part of the path of reciprocatory movement of said first named carriage when said first carriage is in positions which maintain a log supported thereon out of engagement with said saw, an upstanding mechanism having means engageable with the log for partially rotating the same while supported on said first named carriage and positioned on said second named carriage and mounted for reciprocatory vertical movement and for rocking movement about horizontal axes, means operatively connected to said first named carriage for effecting the reciprocatory movement of the latter, means operatively connected to said second named carriage for effecting the limited reciprocatory movement of the latter in phase with said first named carriage, and means operatively connected to the said mechanism for effecting said reciprocatory and rocking movement of the latter.

2. In a sawmill including a vertically disposed saw, a longitudinally extending carriage positioned on one side of said saw and mounted for reciprocatory movement toward and away from said saw for supportingly feeding a log to be cut into and out of engagement with said saw, a second carriage positioned in spaced parallel relation with respect to said first named carriage and mounted for limited reciprocatory movement parallel to and opposite at least a part of the path of reciprocatory movement of said first named carriage when said first carriage is in positions which maintain a log supported thereon out of engagement with said saw, an upstanding mechanism having means engageable with the log for partially rotating the same while supported on said first named carriage and positioned on said second named carriage and mounted for reciprocatory vertical movement and for rocking movement about horizontal axes, fluid means operatively connected to said first named carriage for effecting the reciprocatory movement of the latter, fluid means operatively connected to said second named carriage for effecting the limited reciprocatory movement of the latter in phase with said first named carriage, and fluid means operatively connected to the said mechanism for effecting said reciprocatory and rocking movement of the latter.

3. In a sawmill including a vertically disposed saw, a longitudinally extending carriage positioned on one side of said saw and mounted for reciprocatory movement toward and away from said saw for supportingly feeding a log to be cut into and out of engagement with said saw, a second carriage positioned in spaced parallel relation with respect to said first named carriage and mounted for limited reciprocatory movement parallel to and opposite at least a part of the path of reciprocatory movement of said first named carriage when said first carriage is in positions which maintain a log supported thereon out of engagement with said saw, an upstanding mechanism including a pair of vertically disposed and spaced cylinders, one of said cylinders having the lower end fixedly supported on said second carriage, and the other of said cylinders having the lower end pivotally supported on said second carriage, a piston in each of said cylinders and mounted for reciprocatory movement therein, a piston rod in each of said cylinders having one end connected to the adjacent piston and having the other end projecting out of the upper end of the adjacent cylinder, a transversely disposed crotch positioned between the projecting ends of said piston rods and having each of its ends connected to the adjacent projecting piston rod end for rocking movement about a horizontal axis, a pair of vertically disposed bars each having one end fixedly secured to said crotch intermediate the ends thereof, log engaging means carried by the other end of said bars, means operatively connected to said first named carriage for effecting the reciprocatory movement of the latter, means operatively connected to said second named carriage for effecting the limited reciprocatory movement of the latter in phase with said first named carriage, and a fluid means operatively connected to each of said cylinders for effecting the reciprocatory movement of said pistons and rocking movement of said crotch.

4. In a sawmill including a vertically disposed saw, a longitudinally extending carriage positioned on one side of said saw and mounted for reciprocatory movement toward and away from said saw for supportingly feeding a log to be cut into and out of engagement with said saw, a second carriage positioned in spaced parallel relation with respect to said first named carriage and mounted for limited reciprocatory movement parallel to and opposite at least a part of the path of reciprocatory movement of said first named carriage when said first carriage is in positions which maintain a log supported thereon out of engagement with said saw, an upstanding mechanism including a pair of vertically disposed and spaced cylinders one of said cylinders having the lower end fixedly supported on said second carriage, and the other of said cylinders having the lower end pivotally supported on said second carriage, a piston in each of said cylinders and mounted for reciprocatory movement therein, a piston rod in each of said cylinders having one end connected to the adjacent piston and having the other end projecting out of the upper end of the adjacent cylinder, a transversely disposed crotch positioned between the projecting ends of said piston rods and having each of its ends connected to the adjacent projecting piston rod end for rocking movement about a horizontal axis, a pair of vertically disposed bars each having one end fixedly secured to said crotch intermediate the ends thereof, log engaging means carried by the other end of said bars, a horizontally disposed spring loaded embracing means engaging said vertically disposed bars adjacent to and spaced from the other end thereof for urging the log engaging means away from said log, means operatively connected to said first named carriage for effecting the reciprocatory movement of the latter, means operatively connected to said second named carriage for effecting the limited reciprocatory movement of the latter in phase with said first named carriage, and a fluid means operatively connected to each of said cylinders for effecting the reciprocatory movement of said pistons and rocking movement of said crotch.

5. In a swamill including a vertically disposed saw, a longitudinally extending carriage positioned on one side of said saw and mounted for reciprocatory movement toward and away from said saw for supportingly feeding a log to be cut into and out of engagement with said saw, a second carriage positioned in spaced parallel relation with respect to said first named carriage and mounted for limited reciprocatory movement parallel to and opposite at least a part of the path of reciprocatory movement of said first named carriage when said first carriage is in positions which maintain a log supported thereon out of engagement with said saw, an upstanding mechanism including a pair of vertically disposed and spaced cylinders one of said cylinders having the lower end fixedly supported on said second carriage, and the other of said cylinders having the lower end pivotally supported on said second carriage, a piston in each of said cylinders and mounted for reciprocatory movement therein, a piston rod in each of said cylinders having one end connected to the adjacent piston and having the other end projecting out of the upper end of the adjacent cylinder, a transversely disposed crotch positioned between the projecting ends of said piston rods and having each of its ends connected to the adjacent projecting piston rod end for rocking movement about a horizontal axis, a pair of vertically disposed bars each having one end fixedly secured to said crotch intermediate the ends thereof, log engaging means carried by the other end of said bars, a source of fluid pressure, conduit means providing communication between said cylinders and said source of fluid pressure, a control valve in the conduit means for each cylinder mounted on said second carriage, a push-pull rod slidably supported on said second carriage and operatively connected to both valves, the valve for the fixed cylinder having direct connection with said push-pull rod, the valve for the pivoted cylinder having a lost motion connection with said push-pull rod whereby when said push-pull rod is moved in one direction the piston of said fixed cylinder is operated first and thereafter the piston of said pivoted cylinder is operated to thereby rock said pair of bars toward said log and thereafter reciprocate said bars, means operatively connected to said first named carriage for effecting the reciprocatory movement of the latter, means operatively connected to said second named carriage for effecting the limited reciprocatory movement of the latter in phase with said first named carriage, and means operatively connected to said push-pull rod for sliding the latter to thereby operate said valves.

ROSCOE W. GRIFFITH.

REFERENCES CITED

The following references are of record in the file of this patent:

UNITED STATES PATENTS

| Number | Name | Date |
|---|---|---|
| 162,088 | Miles | Apr. 13, 1875 |
| 516,741 | Lange | Mar. 20, 1894 |
| 944,829 | Stoner | Dec. 28, 1909 |
| 1,437,846 | Hilke | Dec. 5, 1922 |
| 1,464,769 | McLarty | Aug. 14, 1923 |